United States Patent
Butler (10) Patent No.: US 10,289,097 B2
(45) Date of Patent: May 14, 2019

(54) DATA SYSTEM AND METHOD FOR WORK TOOL OF MACHINE

(71) Applicant: Caterpillar SARL, Geneva (CH)

(72) Inventor: Andrew Brian Butler, Clayton, NC (US)

(73) Assignee: Caterpillar SARL, Geneva (CH)

( * ) Notice: Subject to any disclaimer, the term of this patent is extended or adjusted under 35 U.S.C. 154(b) by 302 days.

(21) Appl. No.: 15/097,315

(22) Filed: Apr. 13, 2016

(65) Prior Publication Data
US 2017/0300040 A1    Oct. 19, 2017

(51) Int. Cl.
| | |
|---|---|
| *G05B 19/4155* | (2006.01) |
| *G01S 19/14* | (2010.01) |
| *G01S 5/00* | (2006.01) |
| *E02F 3/96* | (2006.01) |
| *E02F 9/20* | (2006.01) |
| *E02F 9/26* | (2006.01) |

(52) U.S. Cl.
CPC ............ *G05B 19/4155* (2013.01); *E02F 3/96* (2013.01); *E02F 9/2025* (2013.01); *E02F 9/265* (2013.01); *G01S 5/0027* (2013.01); *G01S 19/14* (2013.01); *G05B 2219/34039* (2013.01); *G05B 2219/35565* (2013.01)

(58) Field of Classification Search
CPC ...... G05B 19/4155; G05B 2219/35565; A01B 17/00
See application file for complete search history.

(56) References Cited

U.S. PATENT DOCUMENTS

| | | | | |
|---|---|---|---|---|
| 5,257,199 | A * | 10/1993 | Tsujino | G05B 19/128 |
| | | | | 235/375 |
| 7,099,722 | B2 | 8/2006 | Casey | |
| 8,521,371 | B2 | 8/2013 | Faivre | |
| 8,814,038 | B1 | 8/2014 | Bomer et al. | |
| 2001/0032031 | A1 | 10/2001 | Ufheil | |
| 2004/0073468 | A1 | 4/2004 | Vyas et al. | |
| 2007/0005045 | A1 * | 1/2007 | Mintz | B25J 9/0084 |
| | | | | 606/1 |
| 2008/0086391 | A1 | 4/2008 | Maynard et al. | |
| 2009/0198409 | A1 | 8/2009 | Rector et al. | |
| 2013/0064427 | A1 * | 3/2013 | Picard | G01S 5/163 |
| | | | | 382/103 |
| 2014/0188767 | A1 | 7/2014 | Iyer et al. | |

(Continued)

*Primary Examiner* — Kenneth M Lo
*Assistant Examiner* — Chad G Erdman
(74) *Attorney, Agent, or Firm* — Harrity & Harrity LLP (57) ABSTRACT

A work tool module associated with a work tool of a machine is provided. The work tool module includes an inertia measurement device, a position sensor, a direction indication device, at least one communication interface, and a processing device. The processing device is configured to transmit a utilization data associated with the work tool based on data received from the inertia measurement device. Further, the processing device provides a time stamp information to the utilization data. The processing device transmits a service hour log data of the work tool and an operational data associated with the work tool. The processing device transmits a relative location of the work tool. Additionally, the processing device transmits an absolute location of the work tool based on data received from the position sensor. The processing device transmits an identification signal indicative of a type of the work tool.

20 Claims, 4 Drawing Sheets

(56) References Cited

U.S. PATENT DOCUMENTS

2015/0177731 A1    6/2015  Mader
2015/0253766 A1    9/2015  Pettersson et al.
2016/0237640 A1*   8/2016  Carpenter ............... E02F 9/267
2016/0312432 A1* 10/2016  Wang ........................ E02F 3/96
2017/0016870 A1*   1/2017  McPeek ............. G01N 33/0098
2017/0080960 A1*   3/2017  Moeller ................ B61L 23/047

* cited by examiner

DATA SYSTEM AND METHOD FOR WORK TOOL OF MACHINE

TECHNICAL FIELD

The present disclosure relates to a work tool of a machine. More particularly, the present disclosure relates to a data system and method of communication associated with the work tool of a machine.

BACKGROUND

Machines, such as excavators, wheel loaders, skid steer loaders, and other types of machines may utilize a variety of work tools such as, buckets, hammers, blades, and so on, to perform different tasks. In one example, the operator of the machine may initially attach the bucket to the machine to perform a digging operation, and later detach the bucket and attach the hammer to the machine to perform a breaking operation.

Some of the work tools have advanced functionality such that the work tool may log service hours indicating hours of usage of the respective work tool. Other work tools may include functionality to assist in tracking the location of the work tool. However, these functionalities may result in use of a number of hardware components, resulting in complex and costly solutions. Further, the functionality of these work tools is limited and may not meet growing demands of customers that require multiple advanced functionalities associated with the work tool.

U.S. Published Application Number 2013/0064427 describes methods and systems for object tracking in which the bandwidth of a slow tracking system (e.g., an optical tracking system) is augmented with sensor data generated by a fast tracking system (e.g., an inertial tracking system). The tracking data generated by the respective systems can be used to estimate and/or predict a position, velocity, and orientation of a tracked object that can be updated at the sample rate of the fast tracking system. The methods and systems involve an estimation algorithm that operates on raw sensor data (e.g., two-dimensional pixel coordinates in a captured image) as opposed to first processing and/or calculating object position and orientation using a triangulation or back projection algorithm.

However, in case of the work tool operating in connection with the machine on a worksite, there are other enhanced functionalities that may be required by the operator to efficiently operate the work tool in connection with the machine. Hence, there is a need for an improved solution associated with the work tool for the machine.

SUMMARY OF THE DISCLOSURE

In one aspect of the present disclosure, a work tool module associated with a work tool of a machine is provided. The work tool module includes an inertia measurement device, a position sensor, a direction indication device, at least one communication interface, and a processing device. The processing device is communicably coupled with the inertia measurement device, the position sensor, the direction indication device, and the at least one communication interface. The processing device is configured to transmit, through the at least one communication interface, a utilization data associated with the work tool based on data received from the inertia measurement device. The processing device is configured to provide a time stamp information to the utilization data associated with the work tool. Further, the processing device is configured to transmit, through the at least one communication interface, a service hour log data of the work tool based on the utilization data and the time stamp information associated with the utilization data. The processing device is also configured to transmit, through the at least one communication interface, an operational data associated with the work tool received through the inertia measurement device. The processing device is configured to transmit, through the at least one communication interface, a relative location of the work tool based on the data received from the inertia measurement device and data received from the direction indication device. Additionally, the processing device is configured to transmit, through the at least one communication interface, an absolute location of the work tool based on data received from the position sensor. The processing device is configured to transmit, through the at least one communication interface, an identification signal indicative of a type of the work tool.

In another aspect of the present disclosure, a data system for use with a work tool and a machine is provided. The data system includes a machine module communicably coupled to an on-board controller of the machine, a coordinator module communicably coupled with at least one of a remote server and a personal device, and a work tool module having at least one communication interface and a processing device. The processing device of the work tool module is configured to transmit, through the at least one communication interface, an identification signal to the machine module, wherein the identification signal is indicative of a type of the work tool. The processing device of the work tool module is configured to transmit, through at least one communication interface, a utilization data associated with the work tool to the coordinator module. The utilization data is based on data received from an inertia measurement device located on the work tool module. The processing device of the work tool module is configured to transmit, through the at least one communication interface, an operational data associated with the work tool to the machine module. The operational data is received through the inertia measurement device. The processing device of the work tool module is configured to provide a time stamp information to the utilization data associated with the work tool. The processing device of the work tool module is configured to transmit, through the at least one communication interface, a service hour log data of the work tool to the coordinator module. The service hour log data is based on the utilization data and the time stamp information associated with the utilization data. The processing device of the work tool module is configured to transmit, through the at least one communication interface, a relative location of the work tool to the coordinator module. The relative location is based on the data received from the inertia measurement device and data received from a direction indication device located on the work tool module. The processing device of the work tool module is configured to transmit, through the at least one communication interface, an absolute location of the work tool to the coordinator module. The absolute location is based on data received from a position sensor located on the work tool module.

In yet another aspect of the present disclosure, a method of communicating information between a work tool and a machine is provided. The method includes transmitting, through at least one communication interface located on a work tool module, an identification signal to a machine module. The identification signal is indicative of a type of the work tool. The method includes transmitting, through the at least one communication interface, a utilization data associated with the work tool to a coordinator module. The utilization data is based on data received from an inertia measurement device located on the work tool module. The method includes transmitting, through the at least one communication interface, an operational data associated with the work tool to the machine module. The operational data is received through the inertia measurement device. The method includes providing a time stamp information to the utilization data associated with the work tool. The method includes transmitting, through the at least one communication interface, a service hour log data of the work tool to the coordinator module. The service hour log data is based on the utilization data and the time stamp information associated with the utilization data. The method includes transmitting, through the at least one communication interface, a relative location of the work tool to the coordinator module. The relative location is based on the data received from the inertia measurement device and data received from a direction indication device located on the work tool module. The method includes transmitting, through the at least one communication interface, an absolute location of the work tool to the coordinator module. The absolute location is based on data received from a position sensor located on the work tool module.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
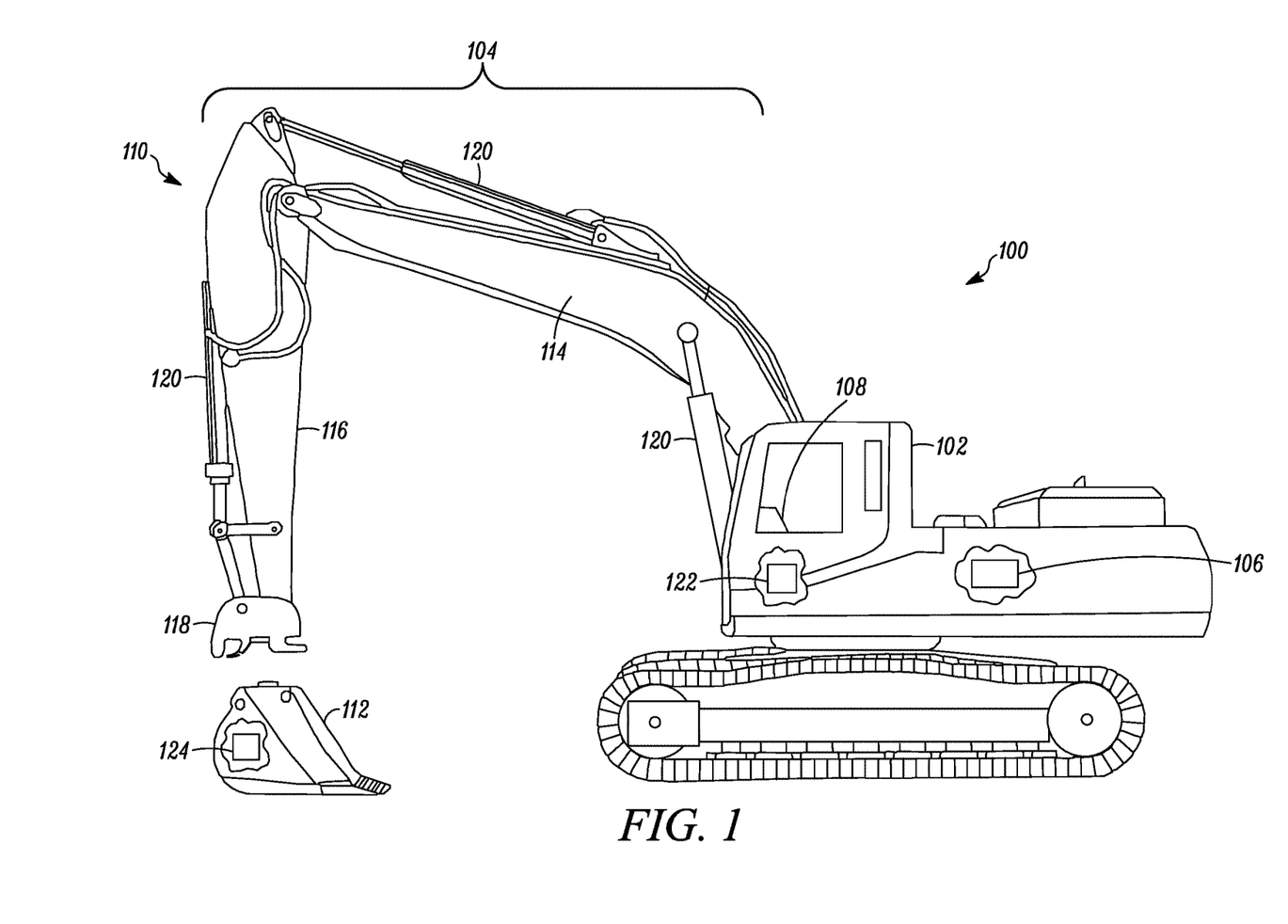
FIG. 1 is a side view of an exemplary machine and a work tool, according to one embodiment of the present disclosure.

FIG. 1 illustrates an exemplary machine 100. The machine 100 is an excavator. Alternatively, the machine 100 may be any other machine that performs some type of operation associated with an industry such as mining, construction, farming, transportation, or any other industry known in the art. For example, the machine 100 may be an earth moving machine, a wheel loader, a skid steer loader, a backhoe, or any other suitable earth moving machine known in the art. The machine 100 includes an operator station 102, a work implement 104, and a hydraulic system 106 that provides pressurized fluid for the work implement 104.

The operator station 102 is a location from which an operator may control the machine 100. The operator station 102 is located on the machine 100 and includes operator input devices (not shown) and/or an operator display 108. Alternatively, the operator station 102 may be located off the machine 100 at a remote location. The operator display 108 provides information regarding the operation or performance of the machine 100. Additionally, the operator station 102 may include other output devices, such as, a speaker, a lighting system, and so on.

The work implement 104 includes one or more linkage members 110 and a work tool 112. The linkage members 110 includes a boom member 114 and a stick member 116. As shown, a first end of the boom member 114 is pivotally connected to machine 100 and a second end of the boom member 114 is pivotally connected to a first end of the stick member 116. A second end of the stick member 116 is connected to a coupling mechanism 118. Each of the linkage members 110 are actuated by one or more actuators 120. The arrangement of the linkage members 110 described herein is exemplary in nature and does not limit the scope of the present disclosure. In other embodiments, the arrangement of the linkage members 110 may vary.

Referring to FIG. 1, the work tool 112 is a bucket. In other embodiments, the work tool 112 may be any interchangeable work tool that may be used to perform a task. The work tool 112 may embody, for example, a grappler, a hammer, a fork, a lifting hook, a saw, a rotary broom, a shear, or any other appropriate work tool known in the art. The work tool 112 is connected to a second end of the stick member 116 via the coupling mechanism 118.

Additionally, the machine 100 includes an on-board controller 122 or Electronic Control Module (ECM) configured to control one or more operational parameters associated with the operation of the machine 100. For example, the one or more operational parameters may include, but not limited to, a ground speed of the machine 100, a direction of traversal of the machine 100, an operation to be performed by the work tool 112 of the machine 100, and so on. In one embodiment, the controller 122 may operate the machine 100 based on one or more commands generated through operation of the input devices located on-board the machine 100 by an operator of the machine 100. The controller 122 may include a central processing unit and may send and receive various signals to and from a number of sensors and components on the machine 100. The functionality of the controller 122 is not limited to that described herein. The controller 122 may additionally include a storage device and other data based files and look-up tables for controlling the operation of the machine 100.

The present disclosure relates to a work tool module 124 coupled to the work tool 112 of the machine 100. The work tool module 124 is located on-board the work tool 112. In a situation in which different work tools 112 are attachable to the machine 100, each of the work tools 112 may have a separate work tool module 124 associated with the respective work tool 112. The structure and functionality of the work tool module 124 will now be described in detail in connection with FIGS. 2 and 3.

Figure 2:
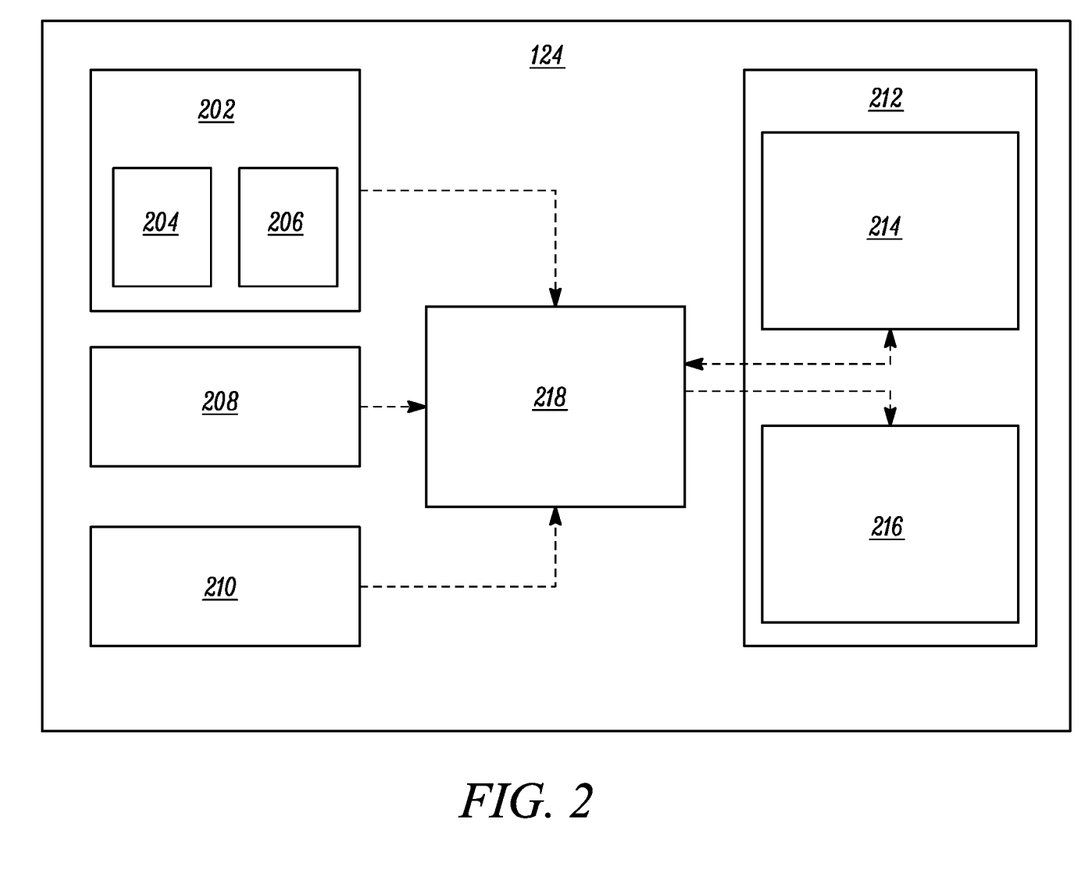
FIG. 2 is a block diagram of a work tool module associated with the work tool of FIG. 1, according to one embodiment of the present disclosure.

Referring to FIG. 2, the work tool module 124 includes an inertia measurement device 202. The inertia measurement device 202 includes an accelerometer 204 and a gyroscope 206. The inertia measurement device 202 is configured to generate a signal indicative of an angular velocity and linear acceleration of the work tool 112. In one embodiment, the inertia measurement device 202 may include two or more of the accelerometers 204 and two or more of the gyroscopes 206, based on the application. The accelerometers 204 and the gyroscopes 206 may be configured to periodically measure angular velocities, specific accelerations, and/or various other motion parameters associated with the work tool 112 and transmit such data. Various commercially available accelerometers 204 and/or gyroscopes 206 can be used, and can be selected based on a variety of characteristics, including weight, size, accuracy, sample rate, etc.

The work tool module 124 also includes a position sensor 208. The position sensor 208 may include a Global Positioning System (GPS) configured to generate a signal indicative of an absolute location of the work tool 112. Further, the work tool module 124 includes a direction indication device 210. In one embodiment, the direction indication device 210 may include a magnetometer. The magnetometer is configured to generate a signal indicative of a direction of movement of the work tool 112.

Further, the work tool module 124 includes one or more communication interfaces 212. Referring to FIG. 2, the work tool module 124 includes a first communication interface 214 and a second communication interface 216. The first communication interface 214 may be a Wireless Local Area Network (WLAN) radio to establish communication between the work tool module 124 and the machine 100. In one embodiment, the first communication interface 214 is a 2.4 GHz RF radio that is a Bluetooth Low Energy (BLE) network.

The second communication interface 216 may be a Wireless Local Area Network (WPAN) to broadcast a current location of the work tool 112 within a given range. In one embodiment, the second communication interface 216 is a sub 1 GHz radio that is IEEE 802.15.4 and 6LoWPAN. The 6LoWPAN (IPv6 over Low Power Wireless Personal Area Network) protocol uses the physical and data link layers defined in the IEEE 802.15.4 standard but adds the IPv6 compression protocol to the network layer for seamless integration into the Internet and the Internet of Things. Alternatively, the second communication interface 216 may include any other short range high frequency network having a lower data rate than that of the first communication interface 214.

The functioning of the first and second communication interfaces 214, 216 to allow the work tool module 124 to communicate with other modules in the system will be described in greater detail in connection with FIG. 3. The number of communication interfaces 212 and the specifications thereof described herein are exemplary and do not limit the scope of this disclosure. Alternatively, other short range high frequency networks may be utilized for communication in the system, based on the needs and requirements of the application. However, in comparison to the first communication interface 214, the second communication interface 216 has a longer range network.

Optionally, the work tool module 124 may include additional components such as a proximity switch (not shown), a linear regulator (not shown), and/or a fuel gauge (not shown). The proximity switch is configured to sense the presence of the machine 100 proximate to the work tool 112. Further, the work tool module 124 may additionally include still other components and/or sensors not described herein, without limiting the scope of the present disclosure. The linear regulator and components such as battery charger, voltage regulator, and battery capacity may be used for power management of the work tool module 124.

The work tool module 124 includes a processing device 218 which is coupled to the inertia measurement device 202, the position sensor 208, the direction indication device 210, and the first and second communication interfaces 214, 216 to receive, process, and transmit the data received from these sub-components of the work tool module 124. The processing device 218 may embody a single microprocessor or multiple microprocessors. Numerous commercially available microprocessors may be configured to perform the functions of the processing device 218, and it should be appreciated that the processing device 218 may readily embody a general machine microprocessor capable of monitoring and/or controlling numerous machine functions. The processing device 218 may include a memory, a secondary storage device, a processor, and any other components for running an application. Various other circuits may be associated with the processing device 218, such as, for example, power supply circuitry, signal conditioning circuitry, data acquisition circuitry, signal output circuitry, signal amplification circuitry, and other types of circuitry known in the art. The processing device 218 may include one or more maps stored within the internal memory of the processing device 218. Each of these maps may include a collection of data in the form of tables, graphs, and/or equations.

Figure 3:
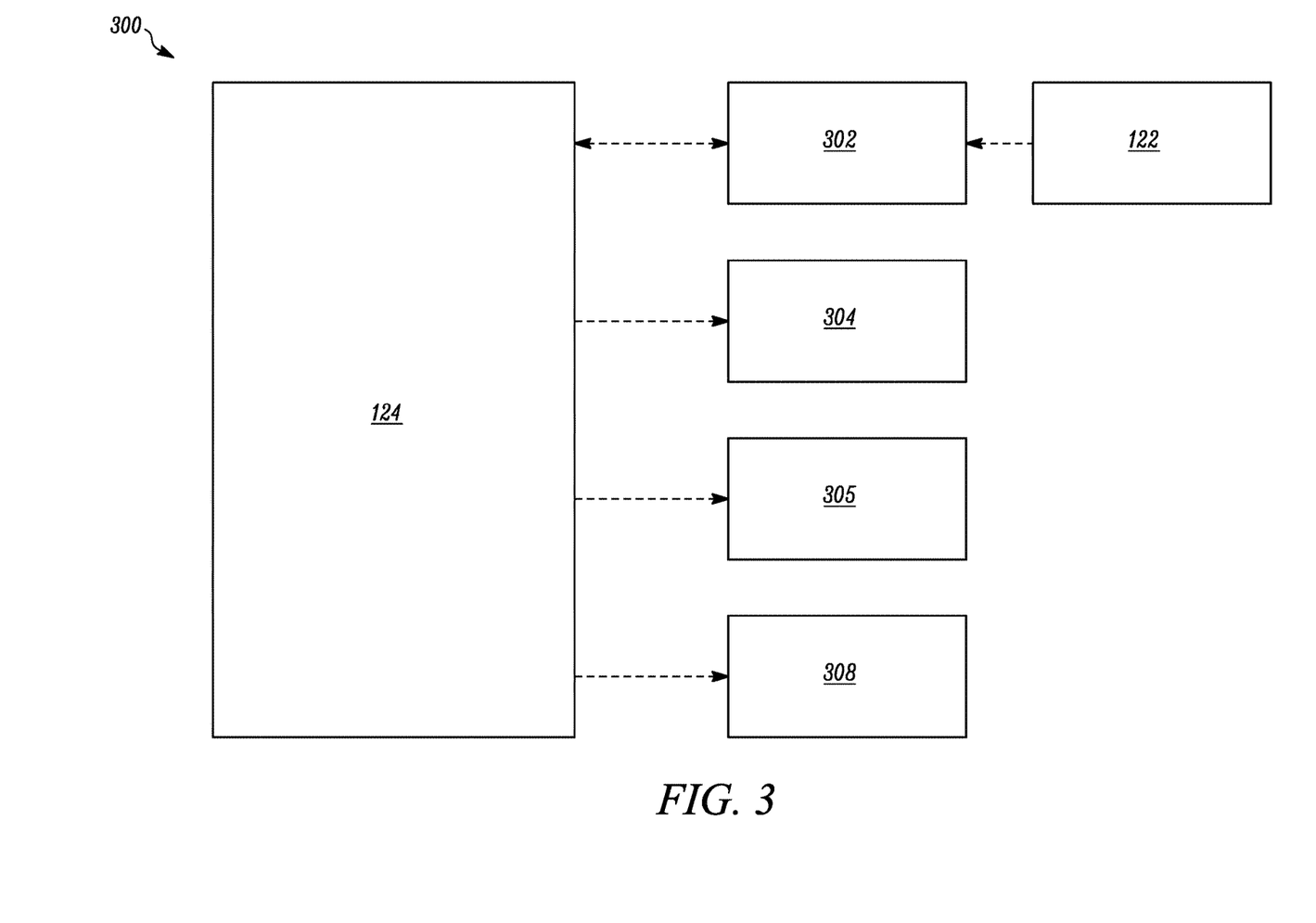
FIG. 3 is a block diagram of an exemplary data system associated with the work tool module of FIG. 2, according to one embodiment of the present disclosure.

Referring to FIG. 3, an exemplary environment of a data system 300 for communication between the work tool module 124 of the work tool 112 and the machine 100 operating at a worksite is illustrated. The work tool module 124 may be communicably coupled to a machine module 302 located on-board the machine 100. The work tool module 124 may communicate with the machine module 302 through the first communication interface 214. In one embodiment, the machine module 302 may be communicably coupled to the controller 122 of the machine 100 and/or other sensors on-board the machine 100.

Optionally, the work tool module 124 may be communicably coupled to a coordinator module 304 associated with the worksite on which the machine 100 and/or the work tool 112 operates. The work tool module 124 may communicate with the coordinator module 304 through the second communication interface 216. In one embodiment, the work tool module 124, the machine module 302, and the coordinator module 304 may establish a communication at the frequency of the second communication interface 216 of the work tool module 124. It is contemplated that in order for this data communication to take place over the short range high frequency communication network, each of the machine module 302 and the coordinator module 304 will also include respective network interfaces.

Further, the work tool module 124 may be capable of independently establishing a communication with one or more personal devices 306, such as, but not limited to, a laptop, a smart phone, a tablet, a computer, and/or any other portable or handheld electronic device, through the first communication interface 214. Accordingly, the personal device 306 may be equipped with Bluetooth 4.0 or later wireless technology to communicate with the work tool module 124. Access to the information transmitted by the work tool module 124 may be made available on the personal device 306 through application software installed on the personal device 306 having necessary access rights. Optionally or additionally, the work tool module 124 may also be capable of establishing a communication with a remote server 308. In one situation, such communication establishment between the work tool module 124 and the personal device 306 and/or the remote server 308 may take place when the machine module 302 and/or the coordinator module 304 are not part of the data system 300.

In one embodiment, the coordinator module 304 may be communicably coupled to the personal device 306 and/or the remote server 308 through any suitable network, such as, for example, the Internet. Accordingly, the coordinator module 304 may be provided with a SIM card or a tethered Ethernet in order to provide access to information exchanged with the work tool module 124 and/or the machine module 302 that are within the radio frequency coverage of the coordinator module 304 to the respective the personal device 306 and/or the remote server 308.

In case of communication with the personal device 306, the information from the work tool module 124 and/or the machine module 302 may be made available through application software that is integrated with the data system 300 to allow suitable levels of access to the information through these applications. These application software may have the capability of pulling information from the work tool module 124 and/or the machine module 302 whenever the respective work tool module 124 and/or the machine module 302 communicates with the personal device 306 and accordingly upload the data to the software application. Additionally, in some embodiments, the personal device 306 may support and provide static asset tracking functionality of the work tool module 124 and/or the machine module 302 by leveraging a GPS module in the personal device 306 and linking that location to the respective work tool 112 or the machine 100 that the personal device 306 is communicating with.

The working of the work tool module 124 as an independent entity of the data system 300 and in collaboration with the machine module 302 and/or the coordinator module 304 will now be described in detail. Referring to FIGS. 2 and 3, the inertia measurement device 202 of the work tool module 124 is configured to generate signals indicative of a current profile of the work tool 112. Further, the inertia measurement device 202 is configured to compare the current profile of the work tool 112 with pre-determined or pre-stored profiles of the work tool 112 associated with activities related to an engagement status of the work tool 112 with the machine 100. Accordingly, based on the comparison, the inertia measurement device 202 is configured to determine if the current profile of the work tool 112 matches the pre-stored profiles of any of these activities.

Based on the determination, the inertia measurement device 202 may be capable of identifying utilization data associated with the work tool 112, that is, if the work tool 112 is being engaged to the machine 100, disengaged from the machine 100, performing work with the machine 100, or if the work tool 112 is not being used. The inertia measurement device 202 may accordingly transmit this data to the processing device 218 of the work tool module 124. The processing device 218 may time stamp the identification of these events using a real-time clock and may store this time stamp information for further processing. Hence, the work tool module 124 may determine a utilization of the work tool 112 based on this utilization data.

In one embodiment, the utilization data may be transmitted by the work tool module 124 through the first communication interface 214 to the machine module 302. In this situation, the machine module 302 may further provide a notification to the operator of the machine 100 of the utilization data indicative of a utilization and/or productivity of the work tool 112 through the output device in the operator station 102. In another embodiment, the work tool module 124 may transmit the utilization data to the coordinator module 304 through the second communication interface 216. Accordingly, when the coordinator module 304 is connected to the personal device 306 and/or the remote server 308, this utilization data of the work tool 112 may be accessed by personnel at a remote location through the communication of the personal device 306 and/or the remote server 308 with the coordinator module 304 over the network. In yet another embodiment, in absence of the machine module 302 and the coordinator module 304, when the work tool module 124 is directly connected to the personal device 306 through the first communication interface 214, the utilization data of the work tool 112 may be made accessible to the personnel at the remote location via the application software installed on the personal device 306.

Further, based on the time stamp information associated with the utilization data, the work tool module 124 may calculate service hour log data associated with the work tool 112. The service hour log data associated with the work tool 112 may be computed by analyzing the utilization data measured by the inertia measurement device 202 and incrementing service hours of the work tool 112 based on the predetermined profiles for the various working operational modes associated with the work tool 112. The service hour log data may be utilized for monitoring of health and/or maintenance of the work tool 112.

In one embodiment, when the work tool module 124 is connected to the machine module 302, the processing device 218 of the work tool module 124 may transmit this service hour log data to the machine module 302 through the first communication interface 214. In this situation, the machine module 302 may further provide a notification to the operator of the machine 100 of the service hour log data indicative of the maintenance of the work tool 112 through the operator display 108 on-board the machine 100.

In another embodiment, the work tool module 124 may transmit the service hour log data to the coordinator module 304 through the second communication interface 216. Accordingly, this service hour log data of the work tool 112 may be accessed by the personnel at the remote location through the personal device 306 or the remote server 308 in communication with the coordinator module 304 over the network. In yet another embodiment, in absence of the machine module 302 and the coordinator module 304, when the work tool module 124 is directly connected to the personal device 306 through the first communication interface 214, the service hour log data of the work tool 112 may be made accessible to personnel at the remote location via the application software installed on the personal device 306. Through the utilization and/or the maintenance functionality of the work tool module 124, the personnel will have access to data related to when the work tool 112 was used last, how many hours of service is logged on the work tool 112, an indication of whether the work tool 112 is due for maintenance, and/or which machine 100 the work tool 112 is attached to, and so on.

The work tool module 124 supports absolute and relative tracking of the work tool 112. The GPS or the position sensor 208 of the work tool module 124 generates a signal indicative of the absolute location of the work tool 112. Accordingly, when the work tool module 124 is connected to the machine module 302, the work tool module 124 may transmit the absolute location of the work tool 112 through the first communication interface 214. In one embodiment, the absolute location of the work tool 112 may be provided to the operator via the output device in the operator station 102 of the machine 100. Also, if the work tool module 124 is connected to the coordinator module 304, the absolute location of the work tool 112 may be transmitted to the coordinator module 304 through the second communication interface 216. In this case, the personnel may be able to receive a notification of the absolute location of work tool 112 on the personal device 306 connected to the coordinator module 304.

As mentioned earlier in this section, the work tool module 124 also supports relative tracking or monitoring of the work tool 112. Accordingly, the inertia measurement device 202 may integrate readings or measurements from the accelerometer 204 to determine distance. Further, the direction indication device 210 may provide an indication of the direction in which the machine 100 headed. Accordingly, the work tool module 124 may combine the measurement data and the direction data to determine the relative location of the work tool 112 with reference to a pre-determined location. This pre-determined location may be a location coordinate of the work tool 112 which was previously determined by the position sensor 208. Hence, in the case of relative tracking, the relative location of the work tool 112 may be obtained without using the GPS. Similar to that in absolute tracking, the work tool module 124 may transmit the relative location of the work tool 112 to the machine module 302 and/or the coordinator module 304.

In one embodiment, the second communication interface 216 of the work tool module 124 may be used to transmit the absolute or the relative location of the work tool 112 to the coordinator module 304 and/or any machine module 302 within the range of the second communication interface 216 of the work tool module 124. Based on receiving this information, the coordinator module 304 may be able to plot the coordinates of the work tool 112 and the machine 100 onto a map of the worksite in order for the respective asset to be easily located.

In another example, the machine module 302 may provide the operator with the absolute or relative location of any work tool 112 within the range of the machine module 302 of the machine 100, as the machine 100 drives around the worksite. Hence, by transmitting the absolute or relative location of the work tool 112 through the second communication interface 216, suitable work tools 112 may be identified and located for potential use by the operator of the machine 100. In one embodiment, when the work tool module 124 is directly coupled to the personal device 306 in the absence of the machine module 302 and the coordinator module 304, active location tracking of the work tool 112 may not be possible. In this situation, the personal device 306 may have access to a last known location of the work tool 112 when the personal device 306 communicates with the work tool module 124.

Further, when the work tool module 124 is communicably coupled to the machine module 302, the work tool module 124 may transmit an identification signal indicative of a type of the work tool 112. The identification signal includes a unique global identification associated with the work tool 112. Based on receiving this identification signal, the machine module 302 may determine the type of the work tool 112. The machine module 302 is configured to send control signals to the controller 122 to alter one or more operational parameters associated with the work tool 112 based on the type of the work tool 112. The one more operational parameters may include, but not limited to, ground speed, hydraulic flow, joystick control patterns, creep control, and so on.

Accordingly, by altering the operational parameters the machine module 302 may automatically optimally operate the work tool 112 based on the type of the work tool 112. In one example, when the work tool 112 is not connected to the machine 100, the machine module 302 may send control signals to the output device in the operator station 102 to display a notification to the operator of a current creeper mode setting. Once the work tool 112 is attached to the machine 100, the machine module 302 may then send control signals to set the creeper mode setting to a previously set user setting of the creeper mode setting for the identified type of the work tool 112 and also display this setting to the operator via the output device. In another example, based on the identification, the machine module 302 may determine if any of the operational parameters of the work tool 112 needs to be altered based on the previously set user setting for the identified type of the work tool 112 or the identified work tool 112.

In one embodiment, based on the type of the work tool 112 identified by the machine module 302, the machine module 302 may restrict certain machine or tool operations in order to reduce or prevent physical damage to the work tool 112. For example, based on the type of the work tool 112, the machine module 302 may restrict forcing more hydraulic flow or pressure on the work tool 112 than that the work tool 112 is rated for.

Further, the processing device 218 is configured to receive an operational data associated with the work tool 112 from the inertia measurement device 202. The operational data includes measurements of the work tool 112 taken from the accelerometer 204 and the gyroscope 206 of the inertia measurement device 202 with respect to the operation of the work tool 112. This operational data may be transmitted through the first communication interface 214 to the machine module 302. The machine module 302 may be configured to additionally receive signals from the controller 122 indicative of one or more commands for articulating the work tool 112. These one or more commands may be indicative of inputs by the operator of the machine 100 through the various input devices, such as, operator control panel, joystick motions, and so on for articulating the work tool 112.

The machine module 302 may then correlate the operational data received from the inertia measurement device 202 and the commands received from the controller 122 to determine if the operator is operating the machine 100 and/or the work tool 112 in an appropriate manner. Further, the machine module 302 may be configured to provide the operator of the machine 100 with one or more feedback, based on the correlation. The one or more feedback may be indicative of coaching tips on potential ways as to how the operator may modify his current method of operating the machine 100 and/or work tool 112 to improve an efficiency of the operation.

For example, in case of a skid steer loader connected to a stump grinder as the work tool 112, the machine module 302 receives the measurements of the inertia measurement device 202 of the stump grinder. Further, the machine module 302 receives the data from the controller 122 indicative of the commanded motions by the operator. The machine module 302 correlates the measurement data and the commanded data to determine that the stump grinder is stalling too frequently. Accordingly, the machine module 302 provides the feedback to the operator via an animation displayed on the output device in the operator station 102 informing the operator to apply a reciprocating relief pressure every two seconds to improve operation of the stump grinder.

In one embodiment, the work tool module 124 may support static coaching by including a quick response (QR) code displayed thereon in order to provide operational tips to the operator. A device capable of scanning the QR code may be used to read the QR code. Further, based on the reading, the operator may be directed to a webpage, a URL link, or a video providing best practice tips on how to operate the given work tool 112.

A person of ordinary skill in the art will appreciate that the work tool module 124, the machine module 302 and/or the coordinator module 304 may additionally include other components not described herein. Moreover, the functionality of the work tool module 124, the machine module 302 and/or the coordinator module 304 explained above is exemplary and does not limit the scope of the disclosure. The work tool module 124, the machine module 302 and/or the coordinator module 304 may additionally perform other functions. Similar to the work tool module 124, the machine module 302 may additionally contain a processing unit embodied as a single microprocessor or multiple microprocessors. Numerous commercially available microprocessors may be configured to perform the functions of the machine module 302, and it should be appreciated that the machine module 302 may readily embody a general machine microprocessor capable of monitoring and/or controlling numerous machine functions.

INDUSTRIAL APPLICABILITY

Figure 4:
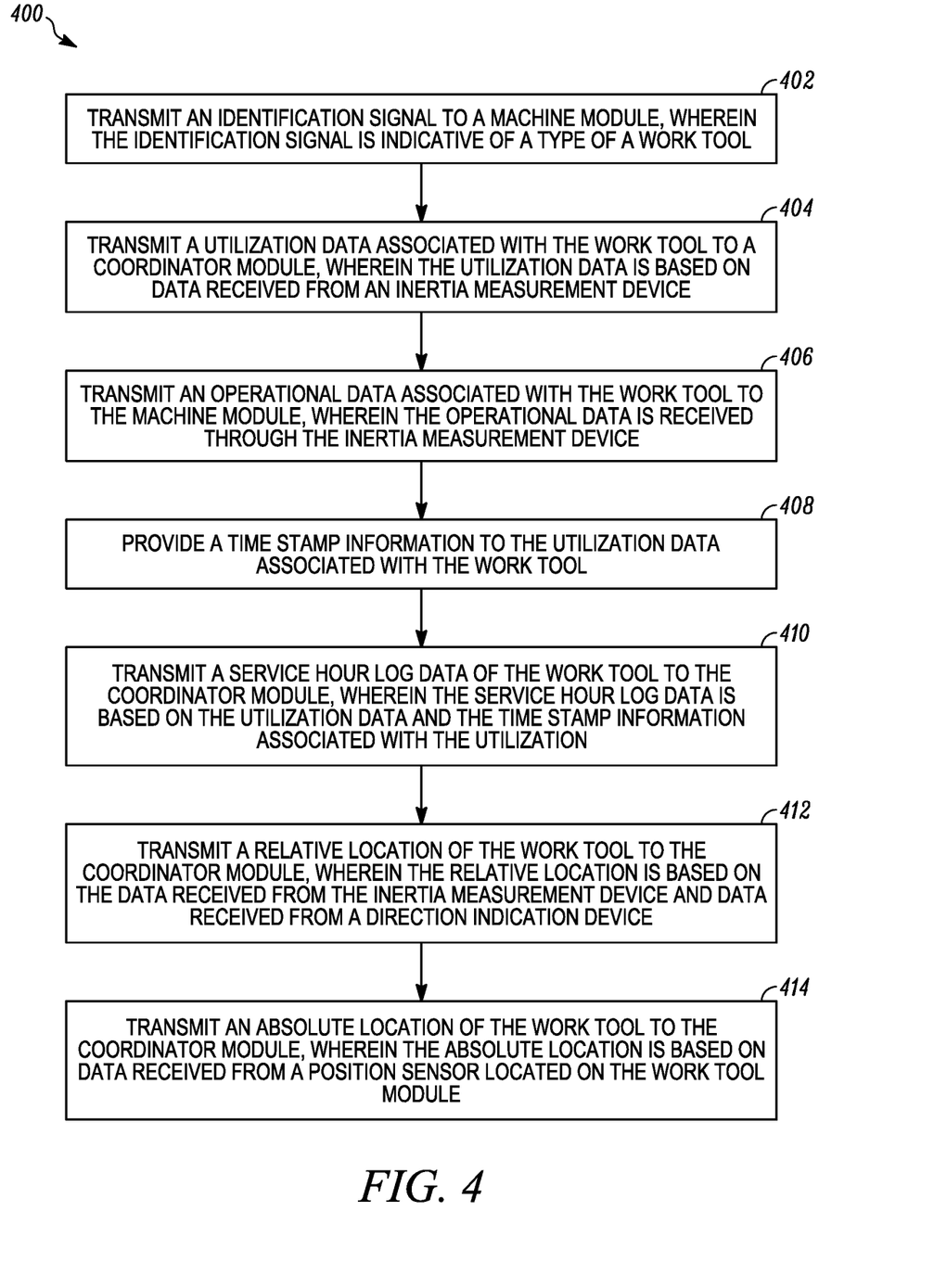
FIG. 4 is a flowchart of a method of communication associated with the work tool module of the machine, according to one embodiment of the present disclosure.

The present disclosure relates to the system and method for data communication for the work tool module 124 associated with the work tool 112. Referring to FIG. 4, a method 400 of operation of the data system 300 is illustrated. At step 402, the work tool module 124 transmits through the first communication interface 214, the identification signal to the machine module 302. The identification signal is indicative of the type of the work tool 112. At step 404, the work tool module 124 transmits through the first and second communication interfaces 214, 216, the utilization data associated with the work tool 112 to the machine module 302 and the coordinator module 304 respectively. The utilization data is based on the data received from the inertia measurement device 202 of the work tool module 124.

At step 406, the work tool module 124 transmits the operational data associated with the work tool 112 to the machine module 302 and/or the coordinator module 304. The operational data is received through the inertia measurement device 202. At step 408, the work tool module 124 provides the time stamp information to the utilization data associated with the work tool. At step 410, the work tool module 124 transmits the service hour log data of the work tool 112 to the machine module 302 and/or the coordinator module 304. The service hour log data is based on the utilization data and the time stamp information associated with the utilization data. At step 412, the work tool module 124 transmits the relative location of the work tool 112 to the machine module 302 and/or the coordinator module 304. The relative location is based on the data received from the inertia measurement device 202 and the data received from the direction indication device 210 located on the work tool module 124. At step 414, the work tool module 124 transmits the absolute location of the work tool 112 to the machine module 302 and/or the coordinator module 304. The absolute location is based on data received from the position sensor 208 located on the work tool module 124.

The work tool module 124 is a single device which may be coupled to the work tool 112. As described in detail in the previous section, the work tool module 124 is capable of performing a variety of functions including providing information related to the utilization and productivity of the work tool 112, health and maintenance of the work tool 112, and tracking of the position of the work tool 112. These functionalities may be realized by the implementation of the work tool module 124 as a standalone device in the data system 300, without requiring the machine module 302 and/or the coordinator module 304.

In one embodiment, when the work tool module 124 is connected to the machine module 302 on the machine 100, the machine module 302 may assist in the utilization and maintenance features. The tracking of the position of the work tool module 124 and/or the machine module 302 may be achieved by each of these modules transmitting their respective locations via the second communication interface 216 to the coordinator module 304, thereby allowing the tracking functionality to be accomplished without the need of a cellular or satellite data plan for each of the distinct modules in the data system 300. The work tool module 124 may also be coupled to the personal device 306 by Bluetooth technology, allowing for direct data transfer through suitable software applications installed on the personal device 306.

Further, when the work tool module 124 is connected to the machine module 302, the work tool module 124 also supports machine integration functionality by providing information for automatically controlling the operation of the work tool 112 when connected to the machine 100. The work tool module 124 also provides information to coach the operator of the machine 100 to optimally operate the work tool 112 when connected to the machine module 302 of the machine 100. The data system 300 provides a cost effective solution having multiple functionalities implemented on the work tool module 124, saving battery life of each of the distinct modules of the data system 300. The work tool module 124 is backwards compatible with the machines 100 that do not possess advanced connectivity functionality through the machine module 302.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A work tool module associated with a work tool of a machine,
the machine being an excavator, an earth moving machine, a wheel loader, a skid steer loader, or a backhoe,
the work tool being a bucket, a grappler, a hammer, a fork, a lifting hook, a saw, a rotary broom, or a shear,
the work tool module being located on-board the work tool, and
the work tool module including:
an inertia measurement device configured to:
identify utilization data associated with the work tool, and
determine a distance by integrating readings or measurements;
a direction indicator device configured to provide an indication of a direction in which the machine is headed;
at least one communication interface; and
a processing device communicably coupled with the inertia measurement device, the direction indication device, and the at least one communication interface,
wherein the processing device is configured to:

determine service hour log data of the work tool based on the utilization data and time stamp information;

transmit, through the at least one communication interface, information identifying the service hour log data of the work tool;

determine a relative location of the work tool, with reference to a pre-determined location, based on the distance and the direction, the pre-determined location being a location coordinate, of the work tool, previously determined by a position sensor;

transmit, through the at least one communication interface, information identifying the relative location of the work tool; and transmit, through the at least one communication interface, an identification signal indicative of a type of the work tool.

2. The work tool of claim 1, wherein the utilization data is based, at least in part, on an engagement status of the work tool with the machine.

3. The work tool of claim 1, wherein the inertia measurement device includes at least one of an accelerometer or a gyroscope.

4. The work tool of claim 1, wherein the position sensor is a Global Position System device.

5. The work tool of claim 1, wherein the direction indication device is a magnetometer.

6. The work tool of claim 1, wherein the at least one communication interface is at least one of a wireless local area network radio and a wireless private area network radio.

7. The work tool of claim 1, wherein the processing device is further configured to communicate, through the at least one communication interface, with a machine module located on board the machine.

8. The work tool of claim 1, wherein the processing device is further configured to communicate with a personal device capable of establishing a communication relationship through the at least one communication interface.

9. The work tool of claim 1, wherein the processing device is further configured to communicate, through the at least one communication interface, with a remote server.

10. The work tool of claim 1, wherein the processing device is further configured to communicate, through the at least one communication interface, with a coordinator module.

11. A data system for use with a work tool and a machine, the data system comprising:

a machine module communicably coupled to an on-board controller of the machine,
wherein the machine includes an excavator, an earth moving machine, a wheel loader, a skid steer loader, or a backhoe;

a coordinator module communicably coupled with at least one of a remote server and a personal device; and a work tool module being located on-board the work tool and having at least two communication interfaces and a processing device,
wherein the processing device is configured to:
receive and process data from multiple sub-components of the work tool module;
transmit, through at least one of the two communication interfaces, an identification signal to the machine module,
wherein the identification signal is indicative of a type of the work tool;

transmit, through at least one of the two communication interfaces, utilization data associated with the work tool to the coordinator module,
wherein the utilization data is based on data received from an inertia measurement device located on the work tool module;

transmit, through at least one of the two communication interfaces, operational data associated with the work tool to the machine module,
wherein the operational data is received through the inertia measurement device;

transmit, through at least one of the two communication interfaces, service hour log data of the work tool to the coordinator module,
wherein the service hour log data is based on the utilization data and time stamp information associated with the utilization data;

transmit, through at least one of the two communication interfaces, information identifying a relative location, with reference to a pre-determined location, of the work tool to the coordinator module,
wherein the relative location is based on information regarding a distance, received from the inertia measurement device, and information regarding a direction received from a direction indication device located on the work tool module, and
wherein the pre-determined location is a location coordinate, of the work tool, previously determined by a position sensor located on the work tool module; and transmit, through at least one of the two communication interfaces, information identifying an absolute location of the work tool to the coordinator module,
wherein the absolute location is based on data received from the position sensor,
wherein the two communication interfaces include a first communication interface and a second communication interface, and
wherein the second communication interface has a longer range network than the first communication interface.

12. The data system of claim 11, wherein the machine module and the coordinator module are configured to communicate with each other over a short range high frequency communication network.

13. The data system of claim 11, wherein the machine module is configured to alter one or more operational parameters of the machine based on receiving the identification signal indicative of the type of the work tool.

14. The data system of claim 11, wherein the machine module is configured to receive data, through the on-board controller on the machine, indicative of one or more commands for articulating the work tool.

15. The data system of claim 14, wherein the machine module is further configured to correlate the operational data associated with the work tool with the data indicative of the one or more commands for articulating the work tool.

16. The data system of claim 15, wherein the machine module is further configured to provide feedback to an operator of the machine based on the correlation.

17. A method comprising:
transmitting, through at least one communication interface located on a work tool module of a work tool and using a processing device of the work tool module, an identification signal to a machine module of a machine,
    wherein the machine is an excavator, an earth moving machine, a wheel loader, a skid steer loader, or a backhoe,
    wherein the work tool includes a bucket, a grappler, a hammer, a fork, a lifting hook, a saw, a rotary broom, or a shear, and
    wherein the identification signal is indicative of a type of the work tool;
identifying, based on data from an inertia measurement device, utilization data associated with the work tool;
identifying, based on data from the inertia measurement device, a distance;
identifying, based on data from a direction indication device, a direction in which the machine is headed;
determining, by the work tool module, service hour log data of the work tool based on the utilization data and time stamp information associated with the utilization data;
providing information identifying the service hour log data;
determining, by the work tool module, a relative location of the work tool, with reference to a pre-determined location, based on the distance and the direction, the pre-determined location being a location coordinate, of the work tool, previously determined by a position sensor; and
transmitting, through the at least one communication interface and by the work tool module, information identifying the relative location of the work tool.

18. The method of claim 17, further comprising:
receiving, from the machine module, one or more control signals based on the type of the work tool; and
altering, based on the one or more control signals, one or more operational parameters associated with the work tool.

19. The method of claim 17, further comprising:
correlating operational data associated with the work tool with data indicative of one or more commands for articulating the work tool,
    wherein the one or more commands are generated through one or more input devices located on-board the machine.

20. The method of claim 19, further comprising:
providing feedback to an operator of the machine based on the correlation.

* * * * *